United States Patent [19]
Tulloch

[11] 4,284,169
[45] Aug. 18, 1981

[54] BUBBLE NOISE REDUCTION

[75] Inventor: Gavin E. Tulloch, Sydney, Australia

[73] Assignee: Plessey Australia Pty. Limited, Villawood, Australia

[21] Appl. No.: 935,777

[22] Filed: Aug. 22, 1978

[51] Int. Cl.³ .............................................. F01N 7/12
[52] U.S. Cl. ................................... 181/211; 181/235; 181/DIG. 1; 181/296
[58] Field of Search ............... 181/175, 233, 234, 235, 181/140, 141, 198, 242, 115, 205, 210, 211, 212, 264, 296; 115/73, 75, 76; 429/4, 6, 119; 55/426, 442

[56] References Cited

U.S. PATENT DOCUMENTS

| 3,415,245 | 12/1968 | Yamamato et al. | 181/235 |
| 3,474,782 | 10/1969 | Cupp | 181/235 X |
| 3,568,672 | 3/1971 | Cupp | 181/235 X |
| 4,002,136 | 1/1977 | Michalak | 115/73 |

FOREIGN PATENT DOCUMENTS

| 903667 | 8/1962 | United Kingdom . |
| 1139079 | 1/1969 | United Kingdom . |
| 1387550 | 3/1975 | United Kingdom . |

Primary Examiner—L. T. Hix
Assistant Examiner—Benjamin R. Fuller
Attorney, Agent, or Firm—Weingarten, Maxham & Schurgin

[57] ABSTRACT

A method and apparatus for reducing acoustic noise associated with the release of gases from a submerged device, such as a sea water battery. A flat piece of material, preferably polyurethane, is mounted onto the top of the device. The piece of material is provided with an outwardly extending lip on the lower surface thereof adjacent an outlet port through which the gases issue. The lower surface of the lip is preferably curved upwardly and outwardly away from the outlet port and is disposed immediately at the upper edge of the outlet port. Gas emitted from the outlet port immediately forms bubbles on the lower surface of the lip, and the bubbles so formed pass outwardly and upwardly along the lower surface and subsequently escape into the free water.

27 Claims, 6 Drawing Figures

BUBBLE NOISE REDUCTION

The present invention relates to submersible gas-evolving devices such as sea water batteries, and has for its object the reduction of acoustic noise associated with bubbles formed by the escape of gases from the submerged device.

An example of such devices is a sea water battery used for powering underwater electrical equipment such as sonar buoys.

Conventionally employed undersea batteries of this type, such as but not limited to those employing silver chloride and magnesium electrodes, employ sea water as the electrolyte, the battery being activated on submersion by the entry of sea water by means of one or more inlet ports located near the base of the battery, and an outlet port located adjacent the top of the battery. During operation of the battery, hydrogen gas is evolved, which collects at the top of the battery and escapes through the outlet port. When such a battery is employed in a sonar listening device, the noise of the escaping hydrogen bubbles can seriously reduce the available useful listening time of the device.

The present invention is directed to an arrangement which reduces this noise, and is particularly applicable to such devices, although it will be appreciated from the description which follows, that the invention is applicable to the reduction of acoustic noise generally, in any case where bubbles are formed by the escape of gas from a submerged device.

Investigations have shown that a major contribution to the noise generated by evolving bubbles in such a situation arises from the actual formation of each discrete bubble. A discrete bubble, by virtue of surface tension, attempts to minimize its surface area and hence occupies a smaller volume than does the volume of gas partly bounded by a gas/water interface and partly bounded by a gas/orifice interface from which it forms.

Upon formation of the discrete bubble, water collapses around the gas as it contracts to the smaller volume with subsequent damped resonant vibration of the gas/water interface surface. There is also collapse of water onto the orifice where a new gas/water interface is formed and collapse of water against water in the vicinity of the orifice where previously two water surfaces were held apart by a volume of gas.

In accordance with the present invention, noise generated in this way upon bubble formation is reduced by the provision, immediately above and adjacent to the gas escape orifice, of a surface against which the bubble may be formed. By allowing the bubble to form against a surface rather than freely in the water adjacent the outlet port, the noise is reduced, and furthermore by suitable choice of the material by which this surface is provided, damping of the resonant vibration of the bubble can be increased, thereby reducing the period of transient noise.

Preferably, but not necessarily, the surface which is provided immediately above the outlet port is provided with a smooth curve in the vertical plane so that bubbles formed against the surface may gently move outwardly and upwardly and pass from the surface into free water without disturbance which could create noise. Any material surface so shaped, positioned above and adjacent to the orifice will reduce the noise because the initial distention of the bubble is decreased. Preferably, the material surface immediately adjacent to the port should exhibit a finite wetting angle with sea water.

According to one embodiment the invention consists of a method for reduction in noise generated by a gas emanating from a submerged orifice consisting in the provision adjacent to said orifice of a surface against which said gas may form bubbles.

According to a second embodiment the invention consists of a submersible apparatus having an orifice from which a gas may escape and a surface against which said gas may form bubbles when said escape takes place during submersion whereby noise generated by formation of said gas into bubbles may be substantially reduced.

One embodiment of the invention will now be described with reference to the accompanying drawings. In the present example the apparatus is a submersible battery.

Figures 2, 3:
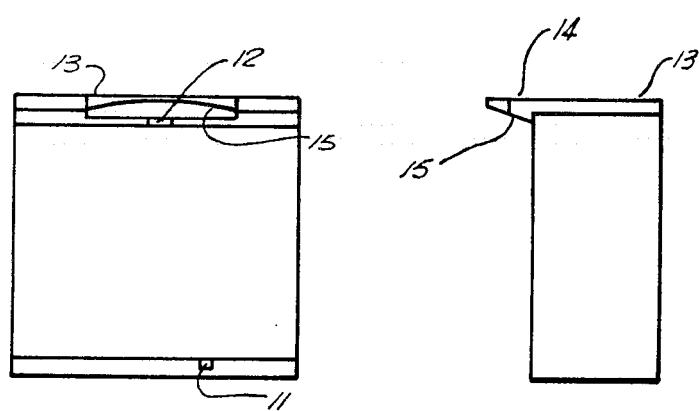
FIG. 2 shows a schematic front elevation of the battery in FIG. 1.
FIG. 3 shows the battery in schematic side elevation.
Figure 1:
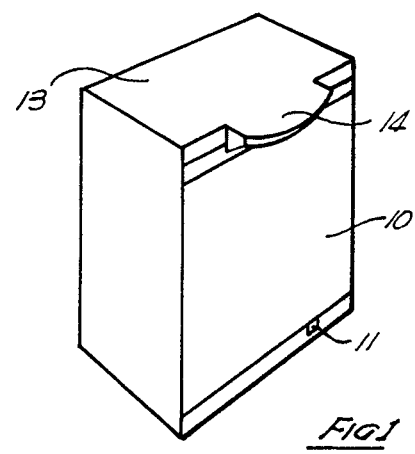
FIG. 1 is a schematic isometric view of a battery modified in accordance with the present invention.

The battery 10 illustrated, which is of a known type employing electrodes of silver chloride and magnesium is provided with an inlet port 11 and an outlet port 12. The outlet port 12 is an orifice having dimensions 3.5 mm by 3.0 mm in one example and 7.0 mm by 3.0 mm in a second example. Mounted on the top of the battery is a flat piece of polyurethane 13 which is provided with an outwardly extending lip 14 the lower surface 15 of which forms the surface against which bubble formation will occur. The surface 15 is curved upwardly and outwardly from the outlet port 12, and it will be noted that this surface 15 is formed so as to be located immediately at the upper edge of the outlet port 12.

Gas evolved from the outlet port 12 forms into bubbles against the adjacent surface 15, and these bubbles then pass outwardly and upwardly against the surface 15 before they escape into the free water.

Figures 5, 6:
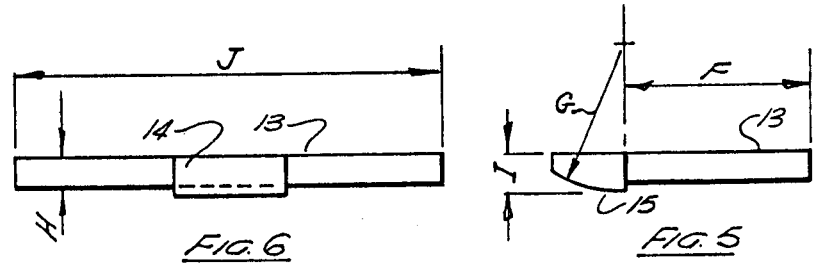
FIGS. 5 and 6 are a side elevation and an end elevation respectively of the part shown in FIG. 4.
Figure 4:
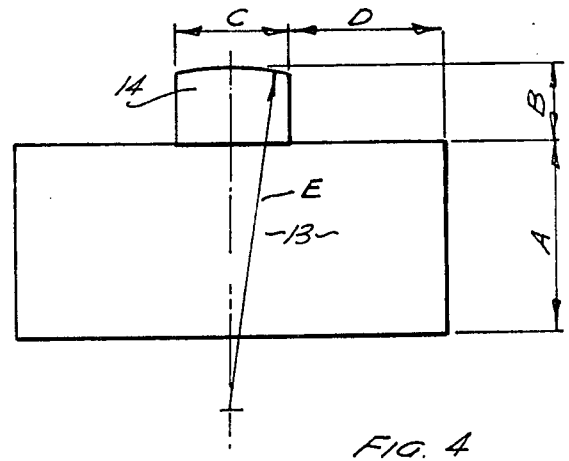
FIG. 4 shows in detail that part of the battery which possesses a surface against which bubbles form.

In the present embodiment the piece of polyurethane 13 and lip 14 have the dimensions as shown in FIGS. 4, 5 and 6, and surface 15 has the shape shown in those figures, where dimension A is 32 mm; B is 13 mm; C is 20 mm; D is 26 mm; E is 58 mm; F is 32 mm; G is 25 mm; H is 5 mm; I is 6 mm; J is 72 mm.

These dimensions have proved effective with bubble evolution rates of 0.5 cc to 3 cc per second at standard temperature and pressure.

As mentioned above, the material employed for the lip 14 is in this cae polyurethane. This has been found to have suitable surface and bulk characteristics. The particular polyurethane material employed in the illustrated embodiment is available from Dupont under the trade mark ADIPRENE, although any polyurethane material should be suitable. Other suitable materials include silicones, and synthetic and natural rubbers.

In conjunction with the present invention, it is preferred in order further to reduce the noise associated with bubble formation, to use an outlet port of greater dimension than that conventionally employed in devices of this type.

It will be appreciated that the manner in which the surface against which bubble formation occurs is provided, is not restricted to the example illustrated. The surface may be provided in a lip or shelf formed integrally with the battery housing or provided in any other suitable way, and the shape and size of the surface and its distance from an edge of the orifice will be a matter for design choice for particular applications.

The claims defining the invention are as follows:

1. A method for reducing noise generated by a gas emanating from a device submerged in a liquid having an upper gas interface, comprising the steps of:
   issuing gas from said device through an orifice disposed thereon and onto a surface disposed immediately adjacent said orifice externally of said device and facing in a direction generally away from said upper gas interface; and
   forming a plurality of discrete bubbles on said surface from said issued gases.

2. The method of claim 1 wherein said surface exhibits a finite wetting angle with said liquid in which said device is submerged.

3. The method of claim 1 further comprising the step of conducting bubbles formed on said surface along said surface toward said upper gas interface and away from said orifice, said surface extending away from said orifice and upwardly toward said upper gas interface of said liquid.

4. The method according to claim 1 wherein said surface has a curved shape.

5. The method of claim 2 wherein said liquid comprises salt water.

6. The method of 1 wherein a portion of said surface forms a portion of a wall defining said orifice.

7. The method of claim 3 wherein said surface has a curved shape.

8. The method of claim 3 wherein said surface exhibits a finite wetting angle with said liquid in which said device is submerged.

9. The method of claim 3 wherein a portion of said surface forms a portion of a wall defining said orifice.

10. A method for reducing noise generated by a gas emanating from a submergible battery submerged in a liquid having an upper gas interface, comprising the steps of:
    issuing gas from said battery through an orifice disposed on said battery and onto a surface disposed immediately adjacent said orifice externally of said battery and facing in a direction generally away from said upper gas interface;
    forming a plurality of discrete bubbles from said issued gases on said surface; and
    conducting bubbles formed on said surface along said surface toward said upper gas interface and away from said orifice.

11. The method of claim 10 wherein a portion of said surface forms a portion of a wall defining said orifice.

12. The method of any one of claims 1, 2, 3, 4, 5, 6, 7, 8, 9, 10 or 11 wherein said surface is formed of polyurethane.

13. The method of claim 10 or 11 further comprising prior to said issuing step, the step of maintaining the pressure of gases within said battery generally equal to the pressure of gases exterior of said battery.

14. An apparatus for reducing noise generated by formation of a gas in a device submerged in a liquid having an upper gas interface, comprising:
    an orifice through which said gas is allowed to issue from said device into said liquid; and
    a surface facing away from said upper gas interface and disposed externally of said device and closely adjacent said orifice, said surface being adapted to permit issued gases to form discrete bubbles thereon immediately upon issuance from said orifice.

15. The apparatus of claim 14 wherein said surface exhibits a finite wetting angle with respect to said liquid.

16. The apparatus of claim 14 wherein said surface extends towards said upper gas interface of said liquid and forms an angle therewith so that said bubbles formed on said surface are conducted away from said orifice and towards said upper gas interface of said liquid.

17. The apparatus of claim 14 wherein said surface has a curved shape.

18. The apparatus of claim 14 wherein a portion of said surface forms a portion of a wall defining said orifice.

19. The apparatus of claim 16 wherein said surface has a curved shape.

20. The apparatus of claim 16 wherein said surface exhibits a finite wetting angle with said liquid.

21. An apparatus for reducing noise generated by formation of a gas within a submergible battery submerged in a liquid having an upper gas interface, comprising:
    an orifice through which said gas is permitted to issue from said battery into said liquid; and
    a surface facing away from said upper gas interface and disposed externally of said battery and closely adjacent said orifice, said surface being adapted to permit issued gases to form discrete bubbles thereon immediately upon issuance from said orifice, said surface having a curved shape and extending away from said orifice upwardly towards said upper gas interface of said liquid to permit bubbles formed thereon to be conducted away from said orifice and towards said upper gas interface, said surface exhibiting a finite wetting angle with respect to said fluid.

22. The apparatus of claim 21 wherein a portion of said surface forms a portion of a wall defining said orifice.

23. The apparatus of any one of claims 14, 15, 16, 17, 18, 19, 20, 21 or 22 wherein said surface is composed of polyurethane.

24. The apparatus of any one of claims 21 or 22 wherein the pressure of gases within said battery is generally equal to the pressure of gases exterior of said battery so that gases formed within said battery merely escape therefrom through said orifice.

25. A method for reducing noise generated by a gas emanating from a device submerged in a liquid having an upper gas interface comprising the steps of:
    maintaining the gas pressure within said device generally equal to the gas pressure external of said device adjacent an orifice disposed on said device;
    issuing gas from said device through said orifice and onto a surface disposed immediately adjacent said orifice externally of said device and facing in a direction generally away from said upper gas interface;
    retaining said issued gases in contact with said surface to allow said issued gases to form discrete bubbles on said surface;
    conducting said discrete bubbles formed on said surface along said surface away from said orifice; and releasing said discrete bubbles from said surface to float toward said gas interface.

26. The method of any one of claims 1, 2, 3, 4, 5, 6, 7, 8 or 9 further comprising prior to said issuing step, the step of maintaining the pressure of gases within said device generally equal to the pressure of gases exterior of said device.

27. The apparatus of any one of claims 14, 15, 16, 17, 18, 19 or 20 wherein the pressure of gases within said device is generally equal to the pressure of gases exterior of said device so that gases formed within said device merely escape therefrom through said orifice.

* * * * *

UNITED STATES PATENT AND TRADEMARK OFFICE
CERTIFICATE OF CORRECTION

PATENT NO. : 4,284,169
DATED : August 18, 1981
INVENTOR(S) : Gavin Edmund Tulloch It is certified that error appears in the above—identified patent and that said Letters Patent is hereby corrected as shown below:

Column 2, line 55, "cae" should read --case--.

Column 3, line 32, "method of 1 wherein" should read --method of claim 1 wherein--.

On the Title page Item [73] should read -- Commonwealth of Australia --.

Signed and Sealed this

Ninth Day of March 1982

[SEAL]

Attest:

GERALD J. MOSSINGHOFF

Attesting Officer    Commissioner of Patents and Trademarks